United States Patent [19]

Pusch

[11] 4,222,065
[45] Sep. 9, 1980

[54] METHOD AND APPARATUS FOR SCANNING AND FOR ELECTRONIC PROCESSING OF THERMAL PICTURES

[76] Inventor: Gunter Pusch, Bannholzweg 12, 6903 Neckargemund-Dilsberg, Fed. Rep. of Germany

[21] Appl. No.: 915,213

[22] Filed: Jun. 13, 1978

Related U.S. Application Data

[63] Continuation-in-part of Ser. No. 710,644, Aug. 2, 1976.

[30] Foreign Application Priority Data

Aug. 2, 1975 [D] .................................... 2534586

[51] Int. Cl.$^3$ .................. H04N 5/33; H04N 3/12; H01L 17/00; H04N 3/02
[52] U.S. Cl. .................................... 358/113; 358/212; 358/199; 358/205; 250/334
[58] Field of Search ............... 358/113, 110, 199, 211, 358/212, 213, 205; 250/330, 334

[56] References Cited

U.S. PATENT DOCUMENTS

| | | | |
|---|---|---|---|
| 3,142,761 | 7/1964 | Rabimow | 358/285 |
| 3,723,642 | 3/1973 | Laakmann | 358/113 |
| 3,941,923 | 3/1976 | Wheeler | 358/113 |
| 4,004,087 | 1/1977 | Ennulat | 358/113 |

FOREIGN PATENT DOCUMENTS

| | | | |
|---|---|---|---|
| 1333838 | 10/1973 | United Kingdom | 358/113 |
| 1411827 | 10/1973 | United Kingdom | 358/113 |

*Primary Examiner*—John C. Martin
*Assistant Examiner*—Edward L. Coles
*Attorney, Agent, or Firm*—Haseltine, Lake & Waters

[57] ABSTRACT

A scanning arrangement in which the scanning speed at right angles to line direction is selected so that every line becomes scanned anew by the following element in picture direction. Reproduction is carried out by way of a series arrangement of luminous diodes. The light-emitting diodes (LEDs) are arranged geometrically corresponding to the detector array. For scanning the thermal picture, use is made of a polygon prism permeable for thermal radiation and beams; for reproduction use is made of a polygon prism permeable for visible radiation or beams. Both prisms are located on the same pivot axis and the scanning of the thermal picture, as well as the reproduction of the visible picture in line direction is achieved by turning both polygons and scanning in picture direction is achieved by tilting the pivot axis.

14 Claims, 6 Drawing Figures

FIG. 3
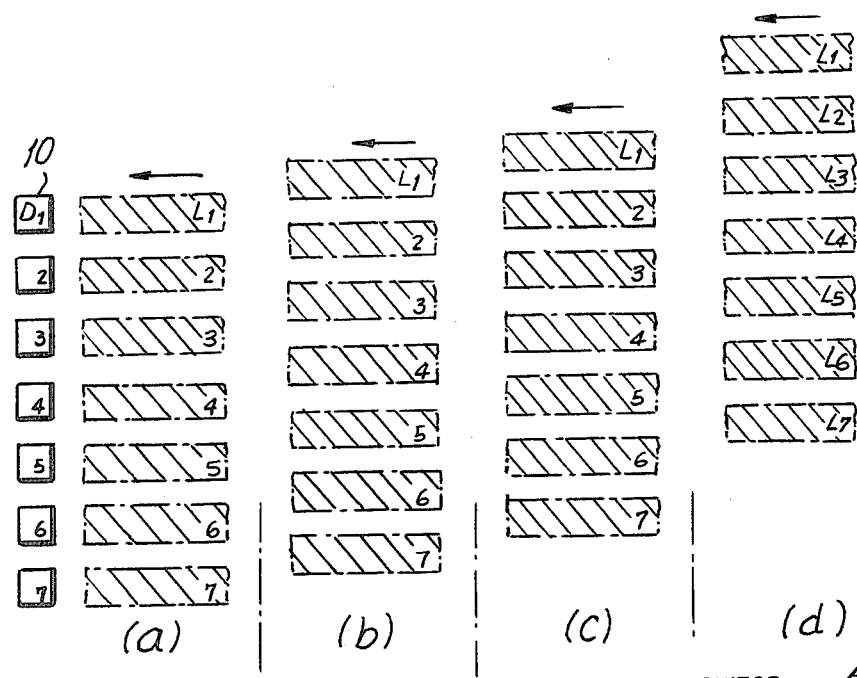
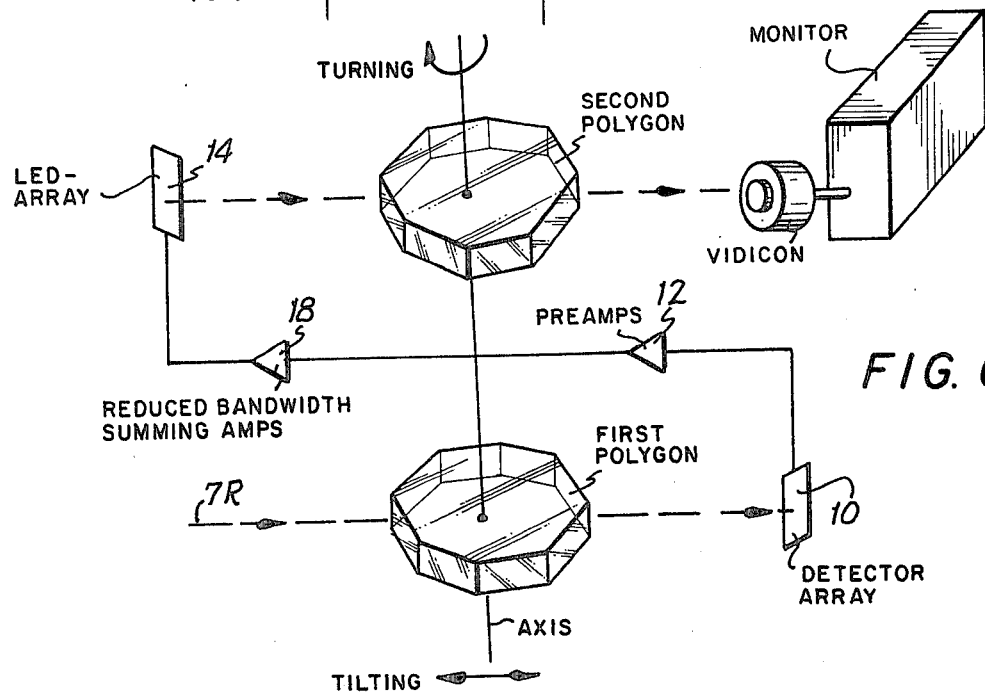
FIG. 6

METHOD AND APPARATUS FOR SCANNING AND FOR ELECTRONIC PROCESSING OF THERMAL PICTURES

BACKGROUND OF THE INVENTION

The present application is a continuation-in-part of the parent application Ser. Number 710,644, filed Aug. 2, 1976.

The present invention relates to a method and an apparatus for scanning and electronic processing of thermal pictures subject to utilizing a multi-element detector array arranged at right angles to the line direction. Every line of the thermal picture is scanned by way of the individual elements and the corresponding lines become superimposed in the reproduction.

If, for example a picture consists of 100 lines and the detector consists of 10 elements, during the first scanning procedure element 1 scans line 1, element 2 scans line 2 and so forth and element 10 scans line 10. During the next scanning procedure, element 1 scans the line 2, element 2 scans line 3 and the element 10 scans the line 11 and so forth. From line 10 on, accordingly, all subsequent lines up to line 90 are scanned ten times while lines 9 and 91 become scanned nine times and lines 2 and 92 are scanned eight times and so forth until reaching lines 1 and 100 which are scanned only once.

This means on the other hand that when middle lines 10 through 90 are superimposed in the reproduction and are received by a storage receiver, as for example the human eye, the signal is amplified by a factor of 10 while the noise which is not correlated with the signal increases only with the root of 10.

It is an object of the present invention to provide an arrangement of the foregoing character which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by providing that one inventive characteristic feature is that the scanning speed is selected at right angles to the line direction so that every line becomes scanned anew by way of the following element in picture direction. If now the scanning in picture direction is made slower, the intermediate spacing of the detector elements can be covered during the following line scanning procedure. This has the decisive advantage that the line structure of the picture substantially disappears.

According to a further concept of the present invention, the reproduction is carried out through an LED array whereby every detector element has an LED associated therewith that is supplied or energized by way of a corresponding amplifier array. Inventively, the LED array of the detector arrangement should be arranged geometrically; accordingly, the ratio of LED area to the intermediate spaces should be the same as the area of the detector elements to the associate intermediate spaces.

If now the outputs of several points of the detector elements are connected in parallel, simultaneously several light-emitting diodes are supplied or energized parallel with the integral signal voltage; this means that the geometric resolution becomes reduced considerably though the thermal sensitivity rises correspondingly. By way of this measure, the geometric resolution can accordingly be interchanged with the thermal resolution and the picture can be processed optimally according to its structure thereof.

While during the interconnection of several elements, there occurs a reduction of resolution only in picture direction and hence an increase of the thermal sensitivity, principally the same effect can be attained in line direction when the electronic band width of the subsequent amplifiers becomes correspondingly reduced. If, for example, three detector elements are combined, the electronic band width is to be reduced to one-third with the result that the resolution is reduced to one-third and thermal sensitivity is raised by square root 3 in line direction additionally to the enhancement of factor 3 in picture direction, that means overall sensitivity by 3 $\sqrt{3}$.

The apparatus in realization of the inventive method can for example, be such that for scanning the thermal picture there is provided a polygon prism permeable for thermal radiation and for reproduction there is used a polygon prism permeable for visible radiation whereby both prisms are located upon the same rotary axis and the scanning of the thermal picture, as well as the reproduction of the visible picture in line direction occures by tilting the pivot or rotating axis.

If the observation of the diode array is by way of a corresponding eyepiece for the human eye, there is provided a positive synchronizing of the thermal and visible picture because of the common pivot or rotary axis of both polygons; there appears accordingly a stationary picture independent of the number of turns and tilt frequency.

According to a further concept of the invention, the features of the light-emitting diode array can also be projected upon the cathode of a television receiver tube, for example, a Vidicon of which the target has storage characteristics. Then a storage of the lines upon the targets occurs independently of the scanning frequency of the scanning-electron beam of the television receiver tube; this means the aforementioned improvement of signal-noise ratio takes place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a schematic diagram and shows the arrangement for scanning a thermal image by lines with a detector array;

FIG. 6 is a schematic view for a scanning and electronic processing arrangement in which scanning occurs in line direction by turning of a polygon prism and scanning in picture direction occurs by tilting of a rotary axis, according to the present invention.

DESCRIPTION OF THE PREFERRED EMBODIMENTS

Figure 1:
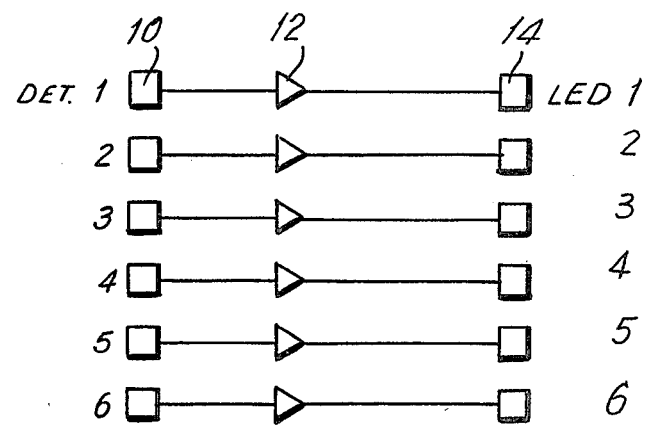
FIG. 1 is a schematic diagram and shows an arrangement for obtaining signals from a detector array.

Since the human eye is in a position to receive only 10 through 20 contrast steps in a predetermined adaptation condition and a thermal picture normally has a much higher contrast scope, a thermal picture can transmit a substantially higher information content when the amplitude range of the thermal video signal becomes subdivided into several parts or regions and a color is applied to every part or region thereof. This is possible according to the invention by assigning to every amplitude region a light-emitting diode array and having every light-emitting diode array project a corresponding picture upon the cathode of a television receiver tube. If, for example, three television receiver tubes are provided for the basic colors of red, green and blue, the light-emitting diode array which supplies "green" to the television receiver tube, can transmit the small thermal signal amplitudes; the luminous diode arrangement which supplies "blue" to the television receiver tube can transmit the middle thermal signal amplitudes; and the luminous diode arrangement which supplies "red" to the television receiver tube can transmit the large thermal signal voltages. This can be effected by way of simple threshold value circuits at the output of the electronic amplifier. It is not necessary that the light-emitting diode arrays themselves give off different colors; decisive is that the video signals of the three television receiver tubes supply the color channels green, blue and red of a color monitor. With such an apparatus, it becomes possible according to the invention that the lines and picture scanning of the thermal picture occurs with a considerably smaller number of lines and scanning speed than the picture scanning in the television receiver tube where the television receiver tube can be scanned with the conventional television standard of, for example, 625 lines and 25 picture changes. Because of the storage effect of the target in the television receiver tube, there does not result *any* reduction of the original thermal and geometric resolution of the picture.

Figure 2:
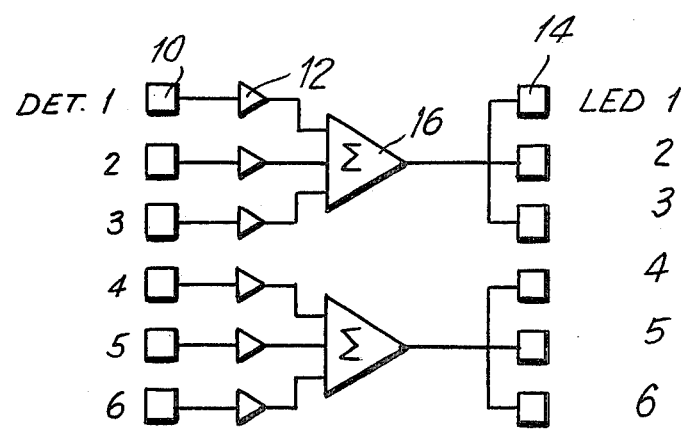
FIG. 2 is a schematic diagram and shows another embodiment for obtaining signals from a detector array.

Referring now to the drawings,

FIGS. 1 and 2 show block diagrams for obtaining signals from a detector array.

The number of elements in the example is 6; it is unlimited as far as electronics is concerned.

FIG. 1 shows operating mode I where each detector 10 controls its own preamplifier 12 and the latter has an LED 14 which is thus associated with only one detector element. This circuit achieves maximum geometric resolution.

FIG. 2 shows the mode II which results from automatic switching from mode I or acts simultaneously on a second LED array from the same detector array. Here also, it is an example from among may possibilities. Of 6 detectors 10 of the detector array, 3 each are combined and connected to a summing amplifier 16 whose bandwidth is reduced to $\frac{1}{3}$ that of the preamplifier 12. This narrow-bank amplifier controls 3 LEDs 14 in parallel. In this mode, by electronic enlargement of the effective detector area and the simultaneous enlargement of the display luminous dots and the reduction of the amplifier bandwidth to $\frac{1}{3}$, the thermal resolution is increased with simultaneous deterioration of the geometric resolution. The limiting case of the operating mode II is the parallel connection of all elements of a detector array.

FIG. 3 illustrates the manner of how the thermal image is scanned by lines by a detector array; after scanning the first line $L_1$, the image is shifted by only 4/5 of the width of a line (for example, by a tilting mirror) (FIG. 3a). Then detector $D_1$, during its second scan (FIG. 3b), once more scans part of the first line, plus the intermediate space between line $L_1$ and line $L_2$ plus a portion of line $L_2$ from the first run-through (scan). The same jump takes place with the third run-through (FIG. 3c) so that the traces made by the detector array on the thermal image overlap repeatedly (for example, for a detector with 100 elements 90 times on the average).

Accordingly, differences in the quality of the individual elements of a detector array are averaged out. Also, the line structure disappears from the display screen.

In this example, FIG. 3d corresponds to the 6th run-through (scan).

In summary, two modes of operation are described. Mode 1 is shown in FIG. 1. One element each of a detector array E 1 to 6 is connected via a preamplifier with an element of an LED 1 to 6.

It is described in further detail how a preamplifier for an infrared detector is connected internally. Standard components that are commercially available, for this purpose, are readily obtained from such manufacturers as Mullard, Southampton or Plessy Semiconductors, Swindon.

Figure 4:
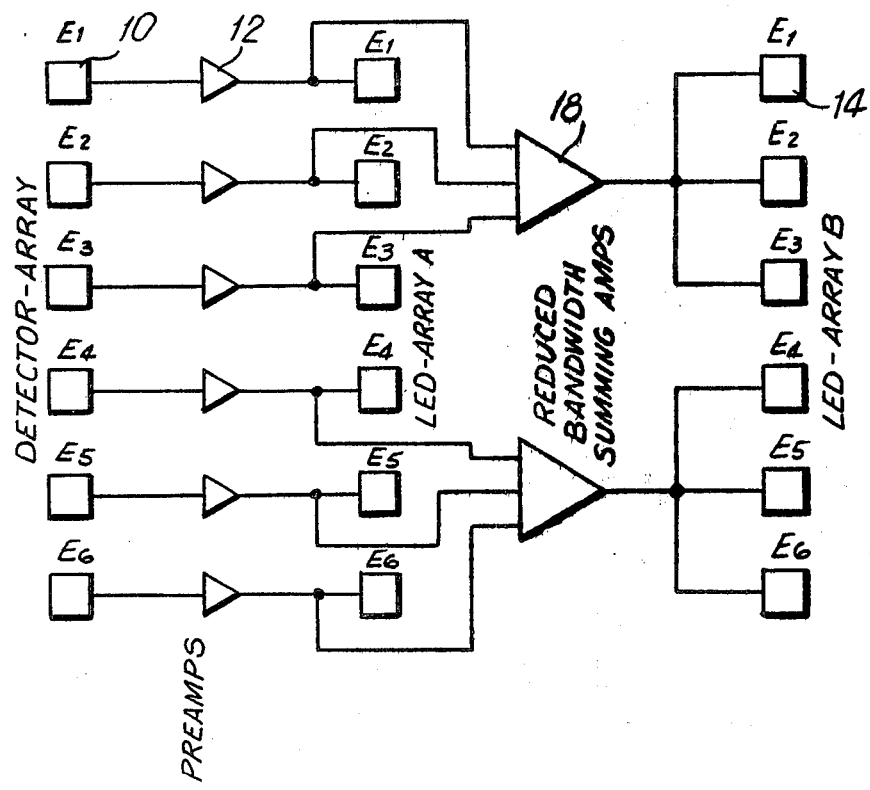
FIG. 4 is a schematic diagram and shows a switching arrangement used in conjunction with the apparatus of FIG. 2.

Mode II is described in FIG. 2. Here the outputs of a group of three preamplifiers 12 are connected to the inputs of a summing amplifier 18 whose bandwidth is reduced to one-third. The output of each summing amplifier 18 feeds three elements 14 of the LED array 1 to 6. Switching from Mode I to Mode II is done either by switching (the type of switches are trivial) or two different color LED arrays are used simultaneously. FIG. 4 shows the schematic.

As described in the application, there are possible not only two modes of operation, but rather 3, 4, 5 or more depending on the number of elements of the detector array or they may be operated in parallel. For example, with a 32-element detector, the following modes are possible:

Mode I: each detector element feeds one LED element.

Mode II: 2 detector elements each feed 2 LED elements each.

Mode III: 4 detector elements each feed 4 LED elements.

Mode IV: 8 detector elements each feed 8 LED elements.

Mode V: 16 detector elements each feed 16 LED elements.

Mode VI: all 32 detector elements feed all 32 LED elements in parallel.

The transition from one mode to another may be achieved by electronic switching. But it can also be accomplished by making a separate LED array available for each mode.

Figure 5:
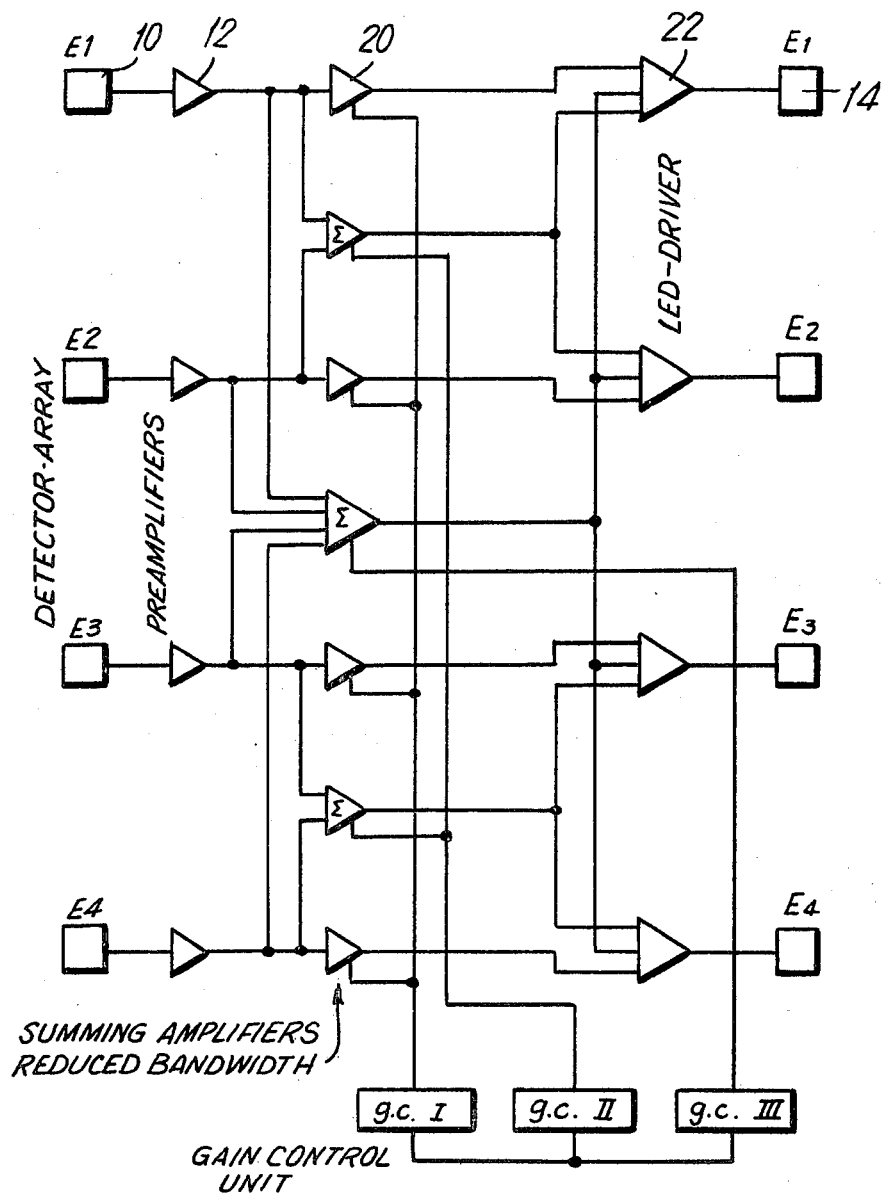
FIG. 5 is a schematic diagram and shows an example of a 4- element detector and 3 modes, in accordance with the present invention.

Finally, transition of modes may be accomplished by feeding each element of the LED array with a summing amplifier 20 which simultaneously receives the signals from all amplifiers of Mode I to VI. Switching from one mode to the next is achieved by regulating the gain in the narrow-band amplifiers. Thus the transition can be made continuous. FIG. 5 shows an example of a 4-element detector and 3 modes. The LED's have drivers 22.

The pure mode I is provided by setting g.c.I=1; g.c.II=0; g.c.III=0.

Pure mode II by g.c.I=0; g.c.II=1; g.c.III=0; etc.

The units for the gain regulation (g.c.I to III) are controlled jointly.

One feature of the present invention is that the control for the switching from one mode to the next takes place simultaneously with the radial scanning of the thermal situation. As a result, in the polar scanning, the advantage of mode I, high geometric resolution, is always used in the center of the image. The advantage of high thermal resolution with low geometric resolution, on the other hand, is always on the edge of the image.

Without further analysis, the foregoing will so fully reveal the gist of the present invention that others can, by applying current knowledge, readily adopt it for various applications without omitting features that, from the standpoint of prior art, fairly constitute essential characteristics of the generic or specific aspects of this invention, and therefore, such adaptation should and or intended to be comprehended within the meaning and range of equivalents of the following claims.

What I claim is:

1. A method for scanning an electronic processing of thermal pictures with a multi-element detector array arranged at right angles to scanning line direction, comprising the steps of: repeatedly scanning every line of a thermal picture with individual detector elements; and superimposing free of delay corresponding lines in a reproduction thereof.

2. A method as defined in claim 1 including the step of selecting a scanning speed at right angles to the line direction so that every line is scanned anew by the following element in picture direction.

3. A method as defined in claim 1 including the step of selecting scanning speed so slow in picture direction that intermediate spacing of detector elements are covered during subsequent line scanning steps.

4. A method as defined in claim 1 including the step of energizing light-emitting diode arrays with an electronic amplifier array for every detector element with reproduction by a light-emitting diode array.

5. A method as defined in claim 1 including the step of selecting a scanning speed at right angles to the line direction so that ever line is scanned anew by the following element in picture direction; selecting scanning speed so slow in picture direction that intermediate spacing of detector elements are covered during subsequent line scanning steps; energizing light-emitting diode arrays with an electronic amplifier array for every detector element with reproduction by a light-emitting diode array; parallel switching outputs of a plurality of detector elements; and reducing the electronic band width in conjunction with parallel switching of corresponding detectors.

6. A method as defined in claim 1 including the step of parallel switching outputs of a plurality of detector elements.

7. A method as defined in claim 5 including the step of reducing the electronic band width in conjunction with parallel switching of corresponding detectors.

8. Apparatus for scanning an electronic processing of thermal pictures with a multi-element detector array arranged at right angle to line direction, comprising: first polygon prism means permeable for thermal radiation for scanning a thermal picture; second polygon prism means permeable for visible radiation for reproduction; rotary axis means; both of said prism means being located upon said rotary axis means, whereby scanning occurs in line direction by turning of said polygon prism means and scanning in picture direction occurs by tilting of said rotary axis means.

9. Apparatus as defined in claim 8 including a television tube in form of a vidicon and having a cathode upon which a picture of the light-emitting diode array is projected.

10. Apparatus as defined in claim 9 wherein said television tube has target means with storage characteristics.

11. Apparatus as defined in claim 7 wherein the thermal video signal has an amplitude range subdivided into a plurality of partial regions, every partial region having a respective light-emitting diode and every light-emitting diode array projecting a corresponding picture upon the cathode of said television tube.

12. Apparatus as defined in claim 11 including color television monitor means; and further television tubes supplying video signals as color signals to said color television monitor means.

13. Apparatus as defined in claim 11 wherein lines and picture scanning of a thermal picture occurs with a substantially smaller number of lines and scanning speed than applied with picture scanning and television tubes scanned according to television standards.

14. Apparatus as defined in claim 8 including a television tube in form of a vidicon and having a cathode upon which a picture of the light-emitting diode array is projected; said television tube having target means with storage characteristics; the thermal video signal having an amplitude range subdivided into a plurality of partial regions, every partial region having a respective light-emitting diode and every light-emitting diode array projecting a corresponding picture upon the cathode of said television tube; color television monitor means; and further television tubes supplying video signals as color signals to said color television monitor means; lines and picture scanning of a thermal picture occurring with a substantially smaller number of lines and scanning speed than applied with picture scanning and television tubes scanned according to television standards.

* * * * *